(12) United States Patent
Zurawski et al.

(10) Patent No.: US 6,635,143 B2
(45) Date of Patent: Oct. 21, 2003

(54) PRODUCT AND PROCESS FOR TOKENS

(75) Inventors: Stanley Zurawski, Las Vegas, NV (US); Scott Martin, Las Vegas, NV (US); James Warren, Las Vegas, NV (US)

(73) Assignee: Independence Mint, Inc., Las Vegas, NV (US)

( * ) Notice: Subject to any disclaimer, the term of this patent is extended or adjusted under 35 U.S.C. 154(b) by 4 days.

(21) Appl. No.: 10/327,159

(22) Filed: Dec. 20, 2002

(65) Prior Publication Data

US 2003/0084596 A1 May 8, 2003

Related U.S. Application Data

(62) Division of application No. 08/134,187, filed on Oct. 8, 1993, now Pat. No. 6,514,374.

(51) Int. Cl.[7] .......................... B32B 31/00; A44C 21/00; G09F 3/00
(52) U.S. Cl. ..................... 156/280; 156/242; 156/278; 156/293; 156/275.5; 427/409; 427/410; 72/359; 40/27.5; 264/1.7; 264/267; 264/268
(58) Field of Search ...................... 156/293, 275.5, 156/278, 280, 242; 72/359; 40/27.5; 427/410, 409, 457; 425/174; 264/1.7, 268, 267

(56) References Cited

U.S. PATENT DOCUMENTS

| 31,871 | A | * | 4/1861 | Copley .................... 40/315 |
|---|---|---|---|---|
| 184,289 | A | * | 11/1876 | Lingg ...................... 279/39 |
| D34,593 | S | * | 5/1901 | Schaefer .................. 279/39 |
| 1,475,652 | A | * | 11/1923 | Polizzi ................... 40/27.5 |
| D100,853 | S | * | 8/1936 | Crosman ................. 40/27.5 |
| 2,050,154 | A | * | 8/1936 | Beck ......................... 40/2 |
| D111,273 | S | * | 9/1938 | Voges ........................ 40/2 |
| 2,196,850 | A | * | 4/1940 | Bostian ....................... 40/2 |
| D149,533 | S | * | 5/1948 | Woofter .................... D34/5 |
| D205,779 | S | * | 9/1966 | Hakim ..................... D34/5 |
| 3,280,489 | A | * | 10/1966 | Bergmann ............... 40/27.5 |
| 3,312,197 | A | * | 4/1967 | Smith ..................... 40/358 |
| 3,350,802 | A | * | 11/1967 | Segel ..................... 40/27.5 |
| 3,636,616 | A | * | 1/1972 | Remning ................. 29/557 |
| D227,787 | S | * | 7/1973 | Dann .................... D29/11 F |
| 3,953,932 | A | * | 5/1976 | Graves ................... 40/27.5 |
| 4,087,570 | A | * | 5/1978 | Beinbrech ................ 427/504 |
| 4,263,734 | A | * | 4/1981 | Bradshaw ................. 40/324 |
| 4,325,556 | A | * | 4/1982 | DeCanto .................. 273/393 |
| 4,527,969 | A | * | 7/1985 | Prinz et al. ........... 424/174.8 E |
| 4,889,366 | A | * | 12/1989 | Fabbiani ................... 283/86 |
| 5,254,525 | A | * | 10/1993 | Nakajima et al. ........... 503/227 |
| 6,514,374 | B1 | * | 2/2003 | Zurawski et al. ........... 156/280 |

FOREIGN PATENT DOCUMENTS

CH            637778        *   8/1993

* cited by examiner

*Primary Examiner*—Linda Gray
(74) *Attorney, Agent, or Firm*—John Edward Roethel (57) ABSTRACT

A token is manufactured using a combination of minting or casting operations and printing operations. The token comprises a metal base material that is minted or cast to the size and shape desired including embossed or debossed areas at selected locations on the token. In selected recessed or countersunk portions of the token, there are provided thin disks of material capable of carrying printed material such as single-colored or multi-colored pictures or indicia. The imprinted disk portions of the token are covered with a first protective coating and, optionally a second protective coating, that eliminates wear and tear on the printed areas of the token. Additionally or alternatively, the entire token can be covered with an outer coating to minimize wear and tear and preserve the unique designs carried by the token.

72 Claims, 9 Drawing Sheets

PRODUCT AND PROCESS FOR TOKENS

CROSS-REFERENCE TO RELATED APPLICATION

This application is a division of U.S. application Ser. No. 08/134,187, entitled "Product and Process for Tokens", filed Oct. 8, 1993, new U.S. patent 6,514,374.

This invention relates to tokens and the process for making tokens, and more particularly to a token and the process for making a token having a metal base material, a center area carrying an imprinted disk having pictures or indicia and an outer coating for protecting the imprinted disk from wear.

BACKGROUND OF THE INVENTION

For many years gaming machines, vending machines and other coin-operated devices have been operated by means of the insertion of monetary coins such as nickels, dimes, quarters and half dollars. As casino gaming increased in popularity, gaming machine manufacturers began making gaming machines that used silver dollars. Eventually, the need for silver dollars to operate these dollar slot machines surpassed the government's desire or ability to produce silver dollars. Gaming casinos were then authorized to use metal gaming tokens having a denominational value of one dollar as a substitute for silver dollars.

The popularity of casino wagering, particularly in connection with slot machines and other electronic gaming machines, also resulted in a need for higher denomination gaming tokens. Gaming tokens are now made that carry denominations of $5.00, $25.00, $100.00 and even $500.00.

As the denominational value of the gaming tokens increased, gaming casinos demanded unique and distinct materials and designs to differentiate their gaming tokens from their competitors' gaming tokens. Gaming tokens cannot be used as substitute currency and can only be used at the gaming establishment that authorized the gaming tokens. The more distinctive and different each gaming casino's gaming tokens are, the easier it is to police the use of the gaming tokens to ensure that unauthorized tokens are not being used.

Gaming tokens have traditionally been minted from non-precious metals such as nickel, zinc, bronze and various composites. As the demand for higher denomination gaming tokens increased, gaming tokens have been minted using more costly metals including gold and silver, either as the base material for the gaming tokens or as a coating on the gaming tokens.

Collectible coins, medallions and commemorative tokens have also grown in popularity in recent years. Either for investment purposes or for more intangible benefits, collecting items has become a significant business and there is an increasing demand for new and unique collectible items. Companies promote new products by distributing one or a series of collectible coins, medallions or tokens having a common theme either as give-aways to encourage purchase of the product or as associated products to the main product line. Sports franchises, restaurant chains and even political campaigns often use collectible coins, medallions or tokens to promote the team, eatery or candidate. Just as T-shirts and caps are sold as memorabilia and souvenirs of historic occasions and places, collectible coins, medallions or tokens can be marketed in conjunction with the celebration of historic occasions or as mementos of visits to historic or memorable locales. Outside of the environment of casino gaming, collectible and commemorative coins, medallions and tokens have been manufactured to commemorate special historical occasions, famous events and individuals and even such personal items as birthdays, graduations and weddings. The commencement of new businesses, the opening of new civic buildings and projects and the inauguration of presidents have been marked by the distribution and sale of commemorative coins, medallions and tokens.

There is also a developing interest in gaming tokens as collectible items because each gaming casino has its own collection of distinctive gaming tokens bearing distinguishable markings on both sides of the gaming tokens. With the spread of casino gaming, people have begun collecting gaming tokens from the various gaming casinos. The gaming casinos do not discourage collection of their gaming tokens because the customer purchases the gaming token at the denominational value of the gaming token which is significantly more than the cost to the gaming establishment to provide the gaming token. The gaming token maintains a minimum monetary value because it can always be redeemed at the gaming casino for its denominational value.

The inherent characteristics of the minting process limit what can be minted on the faces of a collectible coin, medallion or token. During the minting process, the metal of the token blank is physically raised and lowered by the minting dies to create the impression that appears on the faces of the token. These impressions on the face of the tokens deteriorate over time because of normal wear and handling.

For example, gaming tokens are handled by the player during use. Gaming tokens undergo wear and tear as the gaming tokens are inserted into coin acceptors, are handled in the payout hoppers and dispensed back to the player in the coin tray of the gaming machines. Gaming tokens are processed through mechanical equipment for counting in the count rooms of the gaming casino and bagged for recirculation into the hoppers of the gaming machines. The manufacturer of the gaming tokens must take into account all of the handling that occurs and it is desirable to try and extend the useful life of each gaming token.

In 1990, Nevada Coin Mart, Inc., the assignee of the present invention, introduced a gaming token completely covered with a clear, protective coating. This coating for gaming tokens can be completely transparent which allows the user to see the impressions minted into the faces of the gaming tokens. Alternatively, the coating can include a transparent colored dye which allows gaming tokens to be made with distinctive colors either on all or part of the surface of each face of the gaming token.

In 1992, Chipco, Inc., of Las Vegas, Nev. introduced a metal gaming token having its entire surface covered with a non-metallic material upon which was printed, by silk screening, a picture having multiple colors. During use of this gaming token, the non-metallic coating has a tendency to scratch and the aesthetic benefits of the multicolored picture is lost.

In order to fill the requirements of the casino gaming industry for gaming tokens unique to each individual property, there is a need to develop new processes of manufacturing gaming tokens. The burgeoning collectible market is also requiring new collectible and commemorative coins, medallions and tokens that can be sold and traded. Advertisers need new promotional items that can be reproduced in large quantities at a reasonable per item cost; yet are unique and desired by the consuming public.

As used in this specification including the accompanying claims, the term "token" is intended to include not only gaming tokens that have designated denominational values and can be used in mechanical or electrical gaming devices or in live casino games, but also coins, medallions and tokens that have no casino gaming value, but rather are used as promotional items, collectible and commemorative items and may be bought and sold or traded by the general consuming public.

It is an object of the present invention to provide a token that allows designs to be included in many forms on the token that are unique to each casino gaming establishment or each promoter, advertiser or business that desires to sell or give away tokens. The designs include those designs that can be effected by minting or casting operations and designs that can be effected by printing operations. These combinations of designs permit a wide variety of tokens to be manufactured so that each casino gaming establishment, promoter, advertiser or business can use tokens that are distinctive to that establishment or business.

It is a further object of the present invention to provide a process of manufacturing tokens that allows a portion of the token to be made using traditional minting or casting operations so that designs can be included on the token that are customarily available through minting or casting operations. At the same time, the process of manufacturing allows a portion of the token to be made using traditional printing operations so that designs can be included on the token that are customarily available through printing operations. Designs that use multiple colors and shapes that cannot be created only by minting or casting operations but can be created by printing operations can easily be accomplished by the process of the present invention.

It is a feature of the present invention to combine, on a single token, designs that can be achieved by minting or casting operations with designs that can be achieved by printing operations. The printing operation can include multiple colors and sharper images that cannot be achieved by minting or casting operations. A protective coating is also applied to the token to preserve the appearance of the printed portion during use of the token.

It is an advantage of the present invention that unique and distinctive tokens can be created for each casino gaming establishment, promoter, advertiser or business so that each token is readily distinguishable from tokens used by other casino gaming establishments or businesses. The useful life of the tokens is improved and it is much more difficult to counterfeit the tokens. The tokens will have increased interest as collectibles and as promotional items because of the wide range of designs and indicia that can be utilized during the manufacturing of the tokens.

Other objects, features and advantages of the present invention will become apparent from a consideration of the following detailed description.

SUMMARY OF THE INVENTION

A token is manufactured using a combination of minting or casting operations and printing operations. The token comprises a metal base material that is minted or cast to the size and shape desired including embossed or debossed areas at selected locations on the token. In selected recessed or countersunk portions of the token there are provided thin disks of material capable of carrying printed material such as single-colored or multi-colored pictures or indicia. The imprinted disk portions of the token are covered with a protective coating and, optionally a second protective coating, that eliminates wear and tear on the printed areas of the token. Additionally or alternatively, the entire token can be covered with a protective coating to minimize wear and tear and preserve the unique designs carried by the token.

DETAILED DESCRIPTION OF THE PREFERRED EMBODIMENTS

Figure 1:
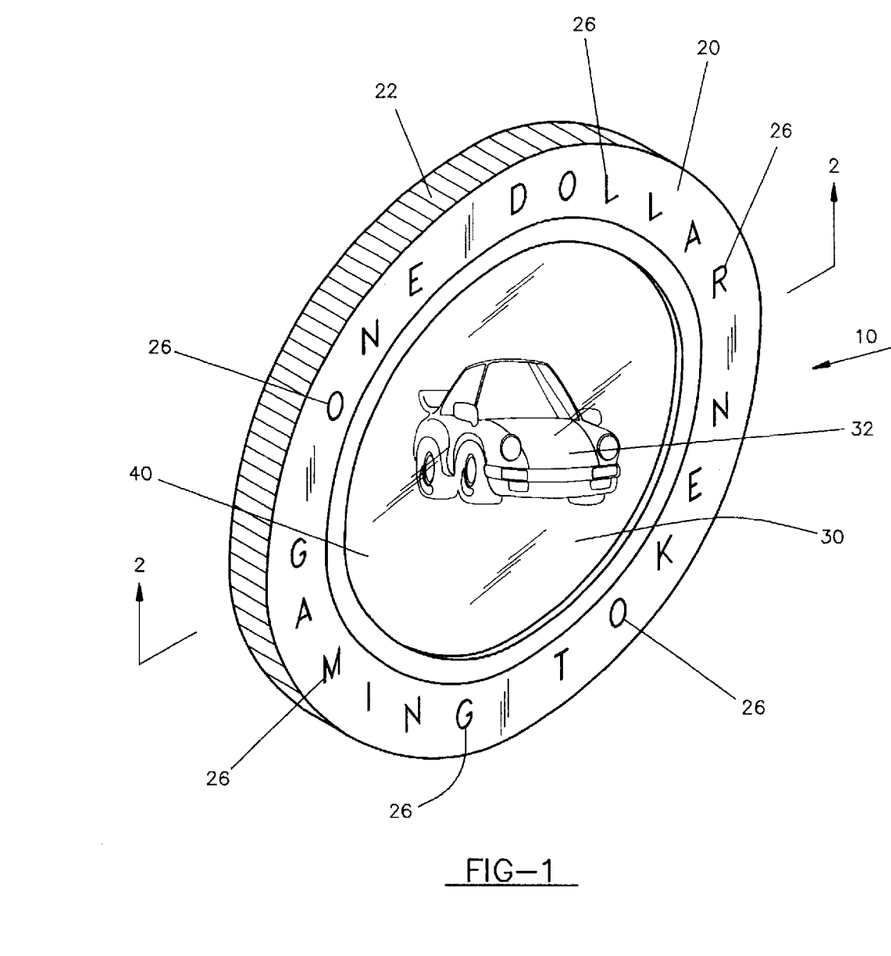
FIG. 1 shows an isometric view of a token manufactured by the process of the present invention.
Figure 2:
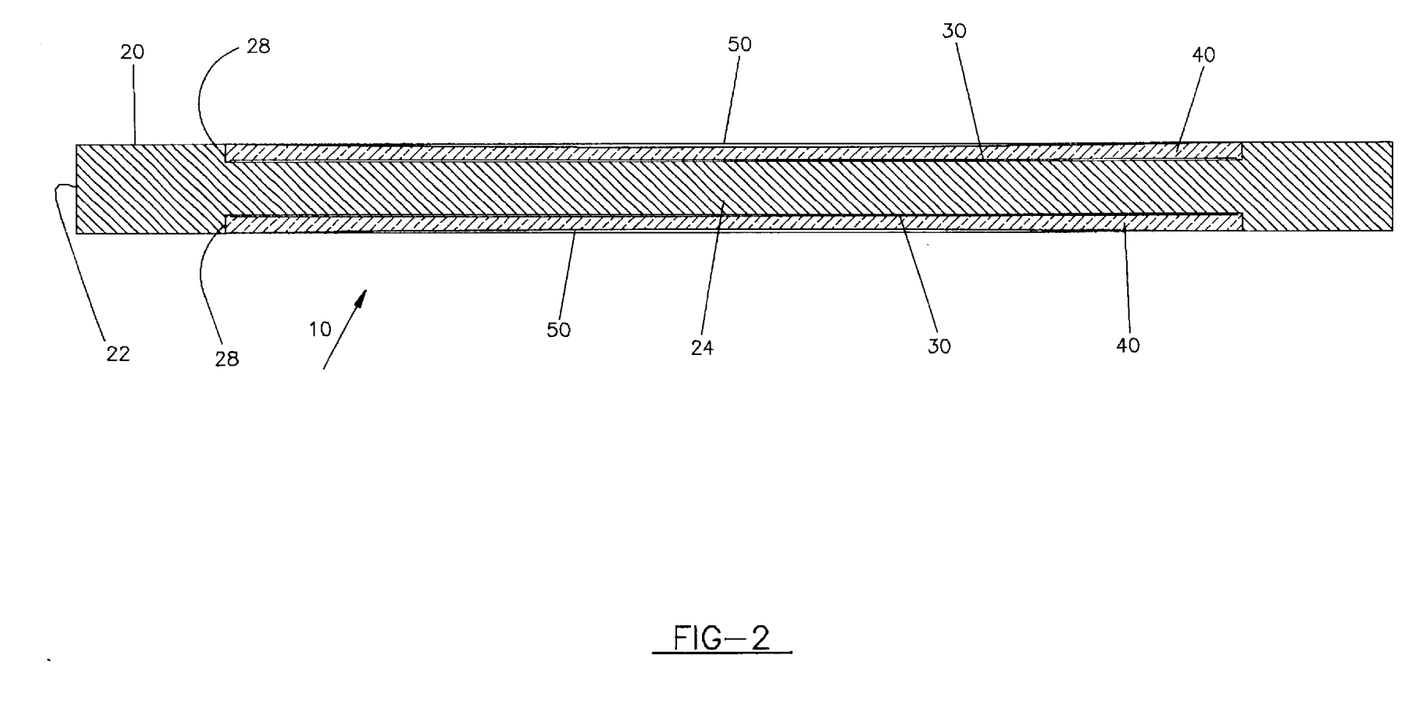
FIG. 2 shows a cross sectional view of the token manufactured by the process of the present invention taken along line 2—2 of FIG. 1.
Figure 3:
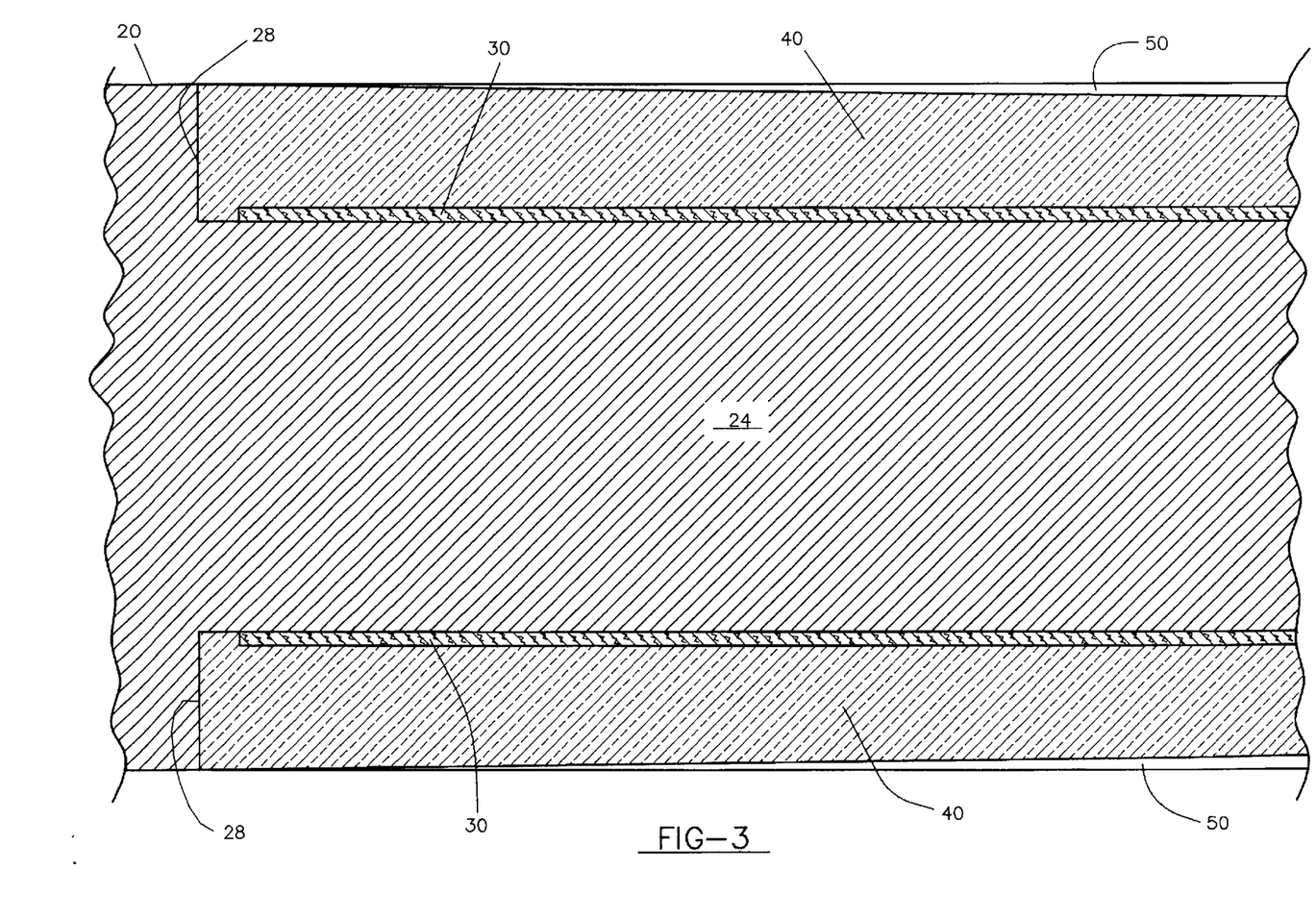
FIG. 3 shows an enlarged cross sectional view of a portion of the token shown in FIG. 2 to show more detail of the present invention.

A token manufactured by the process of the present invention is shown generally at 10 in FIGS. 1–3. The token 10 includes a border area 20 with the edge 22 being either plain or serrated ("reeded") as is conventional.

The token 10 is minted from a blank, which is fabricated in a conventional manner of any suitable metallic composition. The token 10 is struck using a pair of conventional minting dies. During the striking of the token 10 from the blank, a cavity 28 is formed on both sides of the token 10 resulting in a thinner center area 24 of the same metal as the thicker rim portion 22 of the token 10. The minting operation also creates the minted indicia 26 in the metal area of the border area 20. In this border area 20, any indicia 26 that can be formed by conventional minting operations can be used. The minted indicia can be either embossed or debossed indicia in either letter, word, symbol, picture or any other desired format.

Alternatively, the token can be formed by conventional metal casting operations. During the casting of the token 10, a cavity 28 is formed on both sides of the token 10 resulting in a thinner center area 24 of the same metal as the thicker rim portion 22 of the token 10. The casting operation also creates the cast indicia 26 in the metal area of the border area 20. In this border area 20, any indicia 26 that can be formed by conventional casting operations can be used. The cast indicia can be either embossed or debossed indicia in either letter, word, symbol, picture or any other desired format.

The center area 24 is less thick than the border area 20 which results in a cavity 28 on each side of the coin above and below the center area 24. Each cavity 28 is designed to receive an imprinted disk 30 which is covered by a first protective coating 40.

As will be explained below, in the preferred embodiment of the present invention a slight meniscus 50, preferably in the form of a concave meniscus, is provided on the outside surface of the protective coating 40. This meniscus 50 minimizes the possibility of the coating being scratched during use of the token as a gaming token.

Most gaming jurisdictions have adopted regulations setting forth the thicknesses and diameters permitted for various denominations of gaming tokens. A typical gaming token has a thickness of approximately 0.100". The diameter varies depending on the denomination desired by the customer, but a typical $1 denomination gaming token will have a diameter of approximately 1.465".

In the preferred embodiment of the present invention, a typical $1 denomination gaming token would have a depth of cavity 28 on each side of the gaming token of between 0.010" and 0.030". The thickness of the imprinted disk 30 is between 0.001" and 0.003", and if Mylar is used as the imprinted medium, the most preferred thickness for the Mylar is 0.0025". As will be explained below, if holographic imprinted disks are used, the thickness of the holographic material should be between 0.004" and 0.010". The first protective coating 40 fills up the remaining depth of the cavity 28.

The imprinted disk 30 carries printed indicia 32 on its outer surface and the first protective coating 40 is preferably a transparent material so that the printed indicia 32 can be observed by the user of the token 10. Alternatively, the first protective coating can be a translucent material that allows the image of the printed indicia to be observed while at the same time allowing a tint or color to be included into the first protective coating 40.

The process for making the tokens 10 of the present invention basically involves minting or casting the indicia into the border area 20 of the token, placing the imprinted disk 30 into the cavity 28 and coating the token 10 with one or more protective coatings.

Conventional minting operations are used to mint the token 10 and apply the minted indicia 26 to the border area 20 of the token 10. For example, a metal blank of the desired metallic composition is placed between two minting dies. The metal blank is struck by each of the minting dies under high pressure and the final thickness and diameter of the token 10 is created. At the same time, the minted indicia 26 are formed in the border area 20 of the token 10. The recessed cavities 28 on each side of the token 10 are also formed when the minting dies strike the metal blank. Alternatively, a recessed cavity 28 may only be provided on one side of the token 10 with the other side of the token 10 being flat, embossed or debossed.

Alternatively, conventional metal casting operations can be employed to cast the token 10 and to incorporate the cast indicia in the border area 20 of the token 10. The metal composition is cast by any suitable metal casting technique and the cast indicia 26 are formed in the border area 20 of the token 10. The recessed cavities 28 on each side of the token 10 are also formed when the casting of the token occurs.

The next step is to insert the imprinted disk 30 into the cavity 28 of the token 10. In the preferred embodiment of the present invention, each cavity 28 would have a diameter of approximately 1.47" based on a one dollar denomination token 10. Each imprinted disk 30 should be slightly smaller in diameter than the diameter of the cavity 28. This facilitates placement of the imprinted disk 30 in the cavity. The imprinted disk 30 carries whatever printed indicia 32 or designs in the form of letters, words, pictures, drawings or symbols, including any desired single or multiple color combinations, that the customer requires to make each type of token 10 distinctive and unique. In the preferred embodiment, the side of the imprinted disk 30 that contacts the center area 24 of the token 10 will carry an adhesive material to secure the imprinted disk 30 to the center area 24 of the token 10.

The invention is not limited to gaming tokens, so that the size regulations established by various gaming regulatory jurisdictions would not apply to coins, medallions and tokens that have no casino gaming value. The diameter and thickness of the token 10 can be any acceptable size that can be formed by minting or casting techniques. The diameter of the center area 24 can also vary as desired and the diameter of the imprinted disk 30 can also vary between the diameter of the center area 24 down to much smaller diameters.

There are a number of suitable techniques that can be used to make the imprinted disk 30 that carries the printed indicia 32 thereon. One of the preferred materials is polyester film, such as Mylar. The printed indicia 32 can be printed onto the polyester film using any suitable printing techniques. Offset lithographic printing, flexographic printing and rotogravure printing are all suitable methods of imprinting the printed indicia 32 onto the imprinted disk 30.

Another preferred technique for imprinting the printed indicia 32 on the imprinted disk 30 is to chrome-coat onto any good quality coated label stock. This technique is similar to silk screening onto a polyester film material.

Another suitable technique is to use photographic paper as the imprinted disk 30. The printed indicia 32 is filmed onto the photographic paper and then the photographic paper is cut into disks. Each disk is placed into the cavity 28 and the resulting token 10 is passed through a photographic developer to develop the printed indicia 32 on the imprinted disk 30.

Holographic imprinted images can also be used on the imprinted disk 30. A holographic picture can be imprinted on the imprinted disk material by any suitable holographic creation technique. The imprinted disk with the holographic image thereon is then placed in the cavity 28. Because holographic printing techniques require a thicker material substrate than other printing techniques, the thickness of the imprinted disk 30 with a holographic image thereon will normally range between 0.004" and 0.010".

Once the tokens 10 are minted or cast with the cavities 28 on each side of the token 10 (or on one side of the token 10 only if that is the desired format), and once the imprinted disks 30 have been created for placement into each cavity 28, the assembly of the imprinted disk 30 into the token 10 and the application of the first protective coating 40 occurs. This process can be done in a batch mode or in a continuous mode.

In the batch mode process, a coin or a group of coins are placed flat on a work table exposing one of the cavities 28 and a plurality of imprinted disks 30 are also arranged on the work table. An alternative heat pretreatment step can now be performed on each of the imprinted disks 30, in the form of a flame corona discharge treatment. This pretreatment increases the Dyne's level of the imprinted disks 30 to alter the surface energy of the imprinted disks 30 so that the first protective coating 40 will adhere more securely thereto.

An imprinted disk 30 can then be placed by hand into the cavity 28. While this is quite time consuming, it does have the advantage of allowing accurate orientation of the printed indicia 32 on the imprinted disk 30 relative to the minted indicia 26 on the border area 20 of the token 10.

Following this step, the first protective coating 40 is applied to each cavity 28 completely covering the imprinted disk 30. The protective coating is usually provided in liquid form and can be applied by a dropper or nozzle to control accurate placement of the first protective coating. The first protective coating 40 should preferably fill the cavity 28.

In the preferred embodiment of the present invention a slight meniscus 50, preferably in the form of a concave meniscus, is provided on the outside surface of the first protective coating 40. This can be formed by using a flat spatula or other suitable tool. Alternatively, after the first protective coating 40 is applied into the cavity 28, a slightly rounded press member can be pressed into the material of the first protective coating 40. This spreads the coating 40 throughout the entire cavity 28 filling the sides of the cavity 28 and at the same time provides the slightly recessed shape to the meniscus 50.

This meniscus 50 lowers the surface of the first protective coating 40 below the top of the border area 20 on the token. Because of the wear and tear that occurs on the token during use of the token as a gaming token, this meniscus 50 minimizes the possibility of the coating being scratched. A scratched coating could obscure the appearance of the token as well as obscure the ability of the user to see the printed indicia 32 on the imprinted disk 30.

Depending on the type of material used for the first protective coating 40, a solidifying or curing treatment may be needed after application of the first protective coating. Some coating materials may dry adequately with a simple air drying or assisted by blowing air over the coating while others may need a heat treatment or a light treatment, for example an ultraviolet light curing step, to adequately solidify.

If the tokens being created have cavities 28 on each side of the token 10, then the entire assembly process would be repeated for the second side of the token 10.

The assembly of the imprinted disks 30 into the cavities 28 of the token 10 can also be done as a continuous process. A conveyor belt or rotary table can be configured to move the tokens 10 along past each of the work stations of the continuous process.

The optional but preferred first station of the continuous process is an imprinted disk 30 pretreating station. The imprinted disk 30 undergoes a heat pretreatment, in the form of a flame corona discharge. This pretreatment increases the Dyne's level of the imprinted disk 30 to alter the surface energy of the imprinted disk 30 so that the first protective coating 40 will adhere more securely thereto.

The imprinted disks are then placed in the cavity 28 of the token 10. In the preferred embodiment of the present invention, this step is accomplished by using automated equipment. The preferred manner of doing this is to use a label applying machine. For example, label applying machines made by Tronics, Inc., 3650 Research Way, Carson City, Nev. 89706 can be used to apply the imprinted disk 30 to the cavity 28 of the token 10. A plurality of tokens 10 move along on a continuous moving belt and move into position relative to the label applying machine. The imprinted disks 30 are provided on a continuous roll and the label applying machine transfers each imprinted disk 30 into the cavity 28 of the token 10 as the token 10 passes by. The label applying machine can function with an accuracy of 1/64" for proper placement of the imprinted disks 30 in the cavity 28. The underside of each imprinted disk 30 can be provided with an adhesive material, such as glue, to hold the imprinted disk 30 in position in the center of the cavity 28.

The next station of the continuous process applies the first protective coating 40 into the cavity 28 of the token 10. In the preferred embodiment of the present invention, the first protective coating 40 only fills the cavity 28 and does not extend over the other portions of the token 10. The first protective coating 40 is applied by injecting drops of the first protective coating 40 in liquid form from a dropper or nozzle into the cavity 28. The liquid spreads out to fill the entire cavity 28. Alternatively, the first protective coating 40 can be sprayed onto the token 10 from spraying heads positioned adjacent the tokens 10 positioned on the conveyor belt or rotary table. The first protective coating 40 fills the cavity 28 and any excess material can be removed from the surface of the token 10 by brushes or other wiping techniques. At this step it is also desirable to provide the meniscus 50 in the surface of the token 10 as was described above.

Depending on the type of material used for the first protective coating 40, a solidifying or curing treatment station may be needed at this step of the continuous process after application of the first protective coating. Some coating materials may dry adequately with a simple air drying or assisted by blowing air over the coating while others may need a heat treatment or a light treatment, for example an ultraviolet light curing step, to adequately solidify.

The first protective coating 40 can be any suitable protective material that is preferably non-toxic and scratch resistant. Suitable coating materials are varnishes, paints, resins, epoxys, powder coatings or plastics. The preferred coatings should be clear, adhesive, organic and photocurable.

The most preferred first protective coating 40 is a material known as Kaleidoclear, Part No. 500-23-1, made by Uvexs Corporation, 580 North Pastoria, Sunnyvale, Calif. 94086. This coating is an acrylic, urethane based material that is curable by ultraviolet light.

Additionally and optionally, an outer coating can be applied to the tokens 10 at another station on the conveyor belt or rotary table. This outer coating covers the entire token 10 and is designed to prevent scratches and gouges from marring the surface of the metal portion of the token 10 as well as the surface of the first protective coating 40. Any suitable material can be used for the outer coating; in the preferred embodiment, either a silicon-based coating or a pure silicon coating can be used. In the preferred embodiment, the outer coating can be NCM Brite #6, which is a silicone based coating manufactured by J B Chemical, Inc, 3880 East Craig Road, North Las Vegas, Nev. 89030. Alternatively, either Costoldo Jewelry Mold Release or Dow Corning 6-0125 Silicone Dry Film Lubricant can be used as the outer coating.

The coating is preferably applied as a liquid, for example, by spraying each token 10 as it passes by on the conveyor belt or the rotary table. An outer coating drying station can also be provided along the conveyor belt or the rotary table if the outer coating is a liquid material that requires a drying or curing treatment to solidify the coating.

Figure 4:
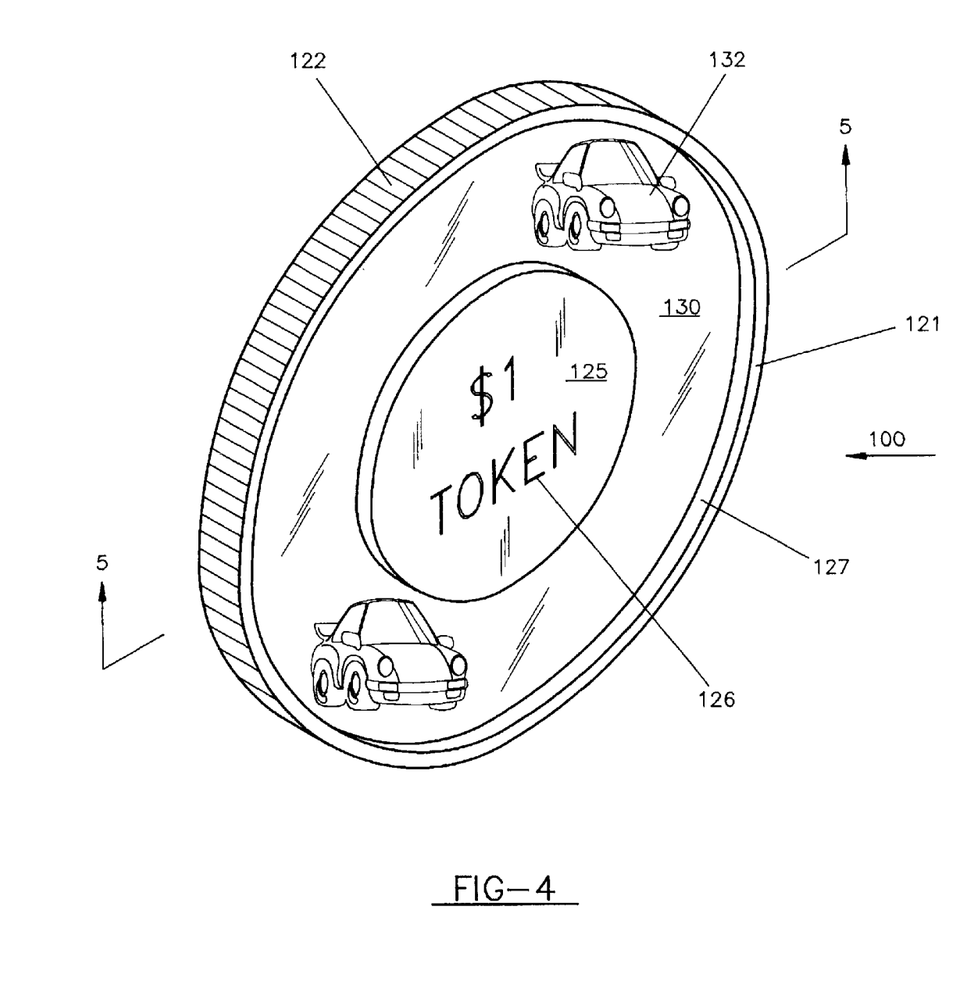
FIG. 4 shows an isometric view of an alternative token manufactured by the process of the present invention.
Figure 5:
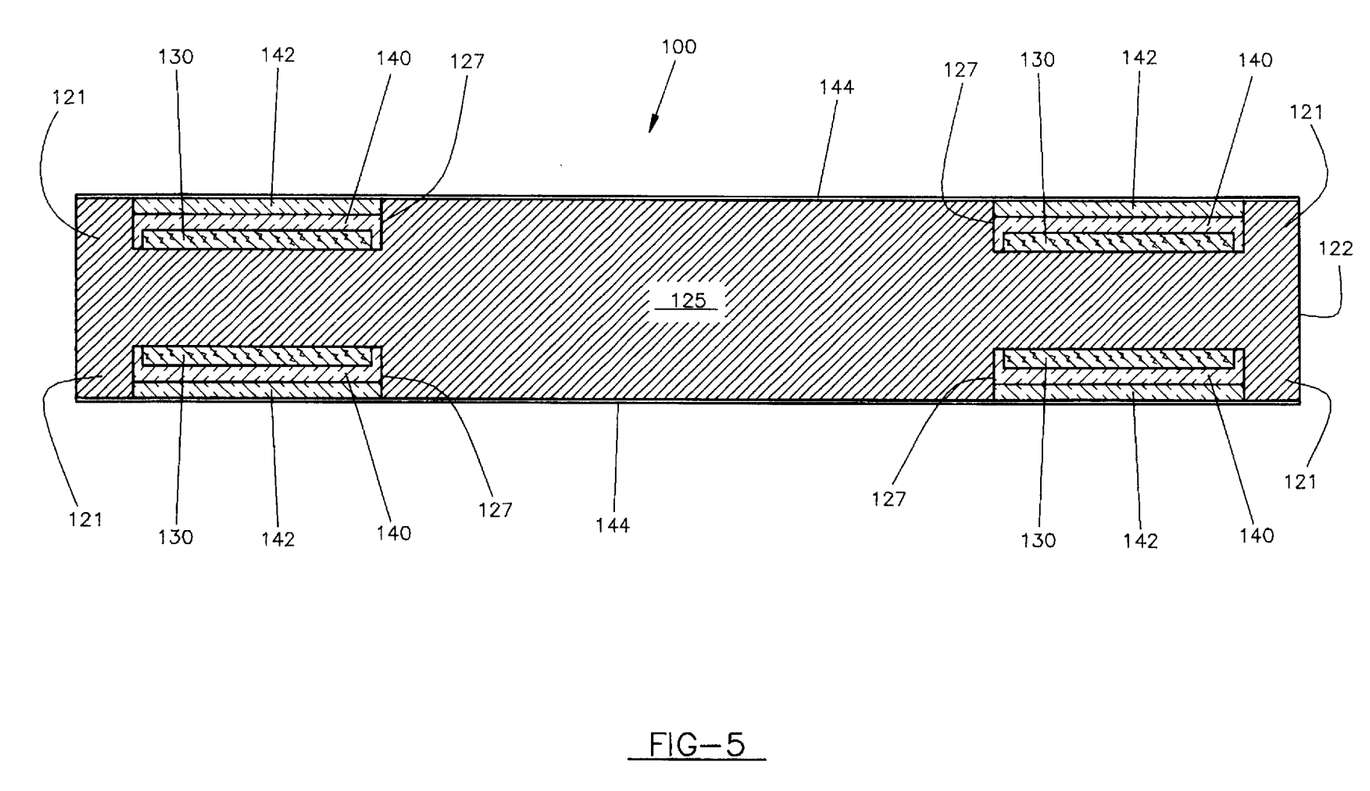
FIG. 5 shows a cross sectional view of the alternative token manufactured by the process of the present invention taken along line 5—5 of FIG. 4.

FIGS. 4 and 5 show an alternative embodiment of the present invention which is a token 100 having a different configuration than the token 10 shown in FIGS. 1–3. The token 100 includes a border area 20 with the edge 22 being either plain or serrated ("reeded") as is conventional.

The token 100 is minted from a blank or cast from any suitable metallic composition into the shape shown in FIG. 4. During the making of the token 100, an annular cavity 127 is formed completely surrounding a raised center area 125. The minting or casting operation also creates the minted or cast indicia 126 in the metal area of the raised center area 125. The minted or cast indicia can be either embossed or debossed indicia in either letter, word, symbol, picture or any other desired format.

The annular cavity 127 can be provided either on one side of the token 100 or each side of the token 100 as shown in FIG. 5. Each annular cavity 127 is designed to receive an imprinted disk 130 that is also generally annular shaped. The imprinted disk 130 can include letters, words, symbols, or pictures in any suitable pattern or design either single or multi-colored.

A first protective coating 140 is applied to cover the imprinted disk 130 in the cavity 127. In this embodiment, the first protective coating 140 fills the cavity 127 to only approximately half of its depth. This first protective coating can be of the same materials used for the first protective coating described in connection with FIGS. 1–3 and can be applied and cured, if necessary in the same manner as described above.

The remaining depth of the cavity 127 is filled with a second protective coating 142. Preferably this second protective coating should be a slip agent in the form of a cationic epoxy including silicones. In the most preferred embodiment, an ultra-violet curable cationic epoxy silicone release coating is used, such as Model 1R70-4 made by Uvexs Corporation, 580 North Pastoria, Sunnyvale, Calif. 94086.

Additionally or optionally, an outer coating 144 can be applied to cover the entire surface of the token 100.

The fabrication steps for forming the token 100, the imprinted disk 130 and for applying the coatings 140, 142 and 144 can be any of the techniques described above in connection with the token 10 shown in FIGS. 1–3 using either a batch processing technique or a continuous processing technique. Likewise, the materials used for the metal portions, the imprinted disk 130, the first protective coating 140 and the outer coating 144 can also be the same materials that were described above in connection with the token 10 shown in FIGS. 1–3.

Figure 6:
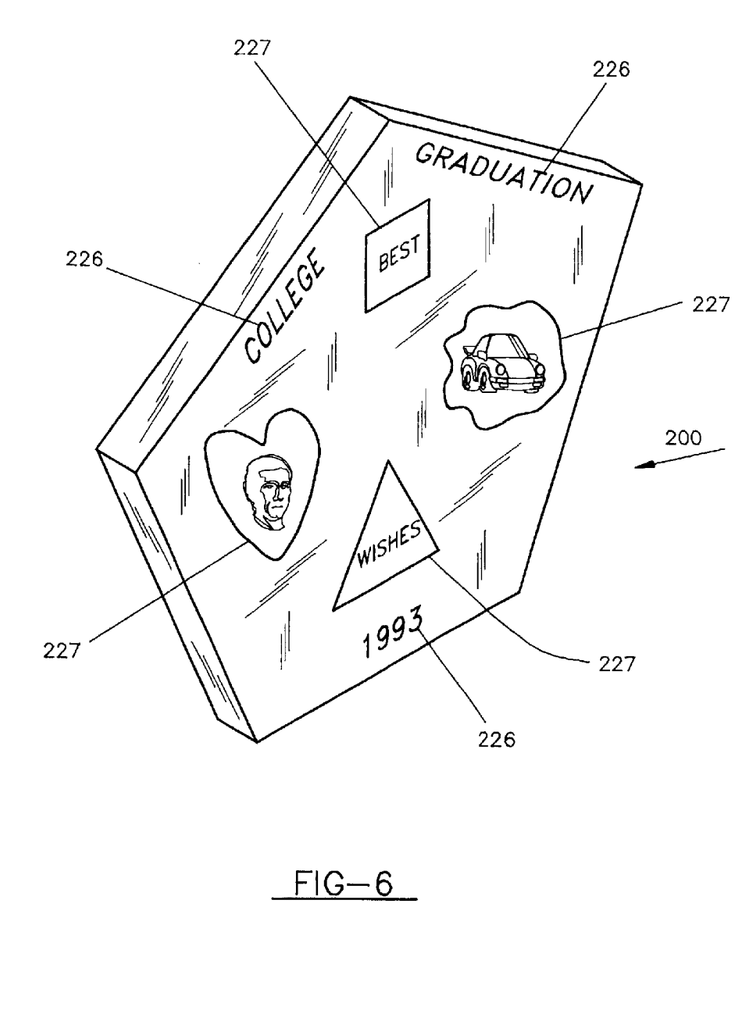
FIG. 6 shows an isometric view of a third token manufactured by the process of the present invention.

The invention is not limited to circular tokens. FIG. 6 shows a token 200 of the present invention that is formed in the shape of a polygon. Minted or cast indicia 226 can be formed in the generally planar metal portion of the token 200 and one or more cavities 227 having any perimeter shape can be provided to receive imprinted disks having letters, words, symbols or pictures in any suitable pattern or design either single or multi-colored. Each of the cavities 227, after having the imprinted disk inserted therein, is filled with a first protective coating and a second protective coating. Additionally or optionally, an outer coating can be applied to cover the entire surface of the token 200.

The fabrication steps for forming the token 200 and the imprinted disks and for applying the coatings can be any of the techniques described above in connection with token 10 and token 100 shown in FIGS. 1–5 using either a batch processing technique or a continuous processing technique. Likewise, the materials used for the metal portions, the imprinted disks, the first protective coating, the second protective coating and the outer coating can also be the same materials that were described above in connection with token 10 and token 100 shown in FIGS. 1–5.

The non-circular token 200 shown in FIG. 6 is most suitable for the collectible and commemorative market because gaming token use generally requires circular tokens that will work in the various gaming devices and token counting devices that are prevalent in the gaming casinos.

The non-circular token 200 shown in FIG. 6 can be provided with cavities either on one side of the token or on both sides, in the same manner as the tokens shown in FIGS. 1–5.

Figure 7:
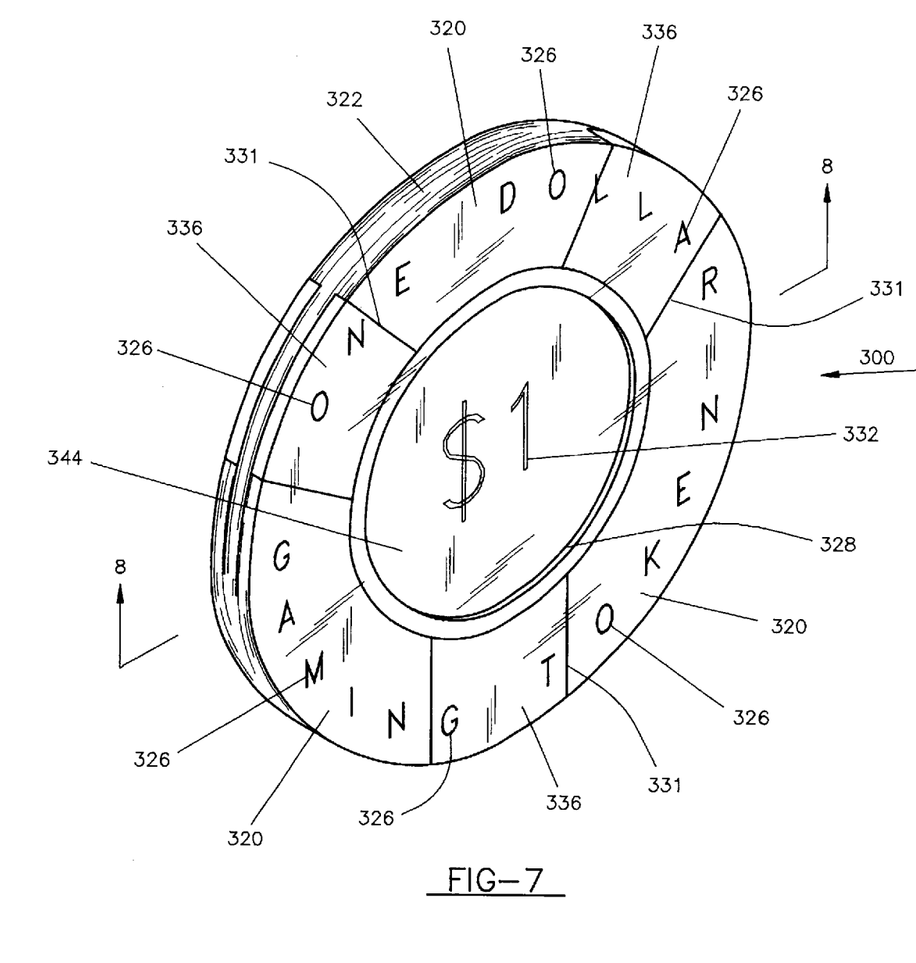
FIG. 7 shows an isometric view of a fourth token manufactured by the process of the present invention.
Figure 8:
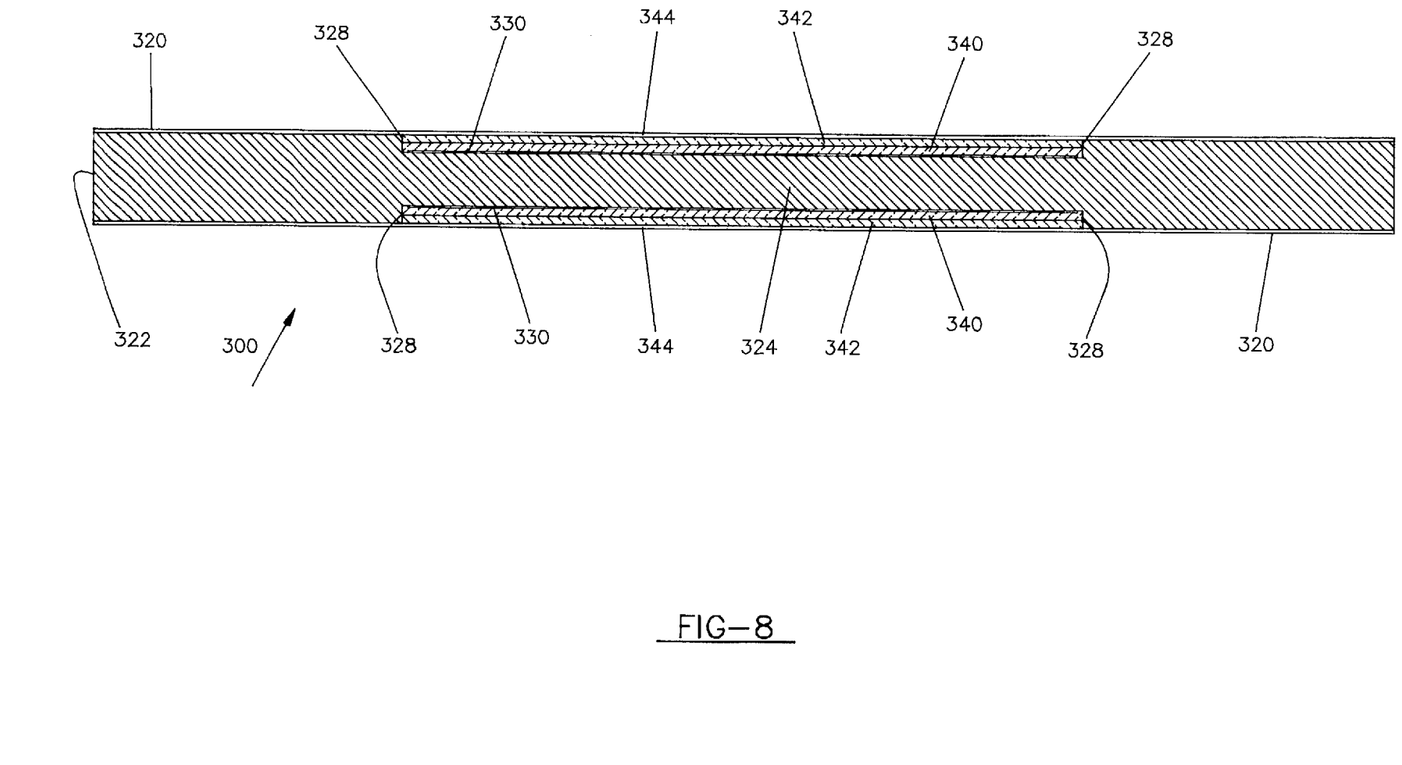
FIG. 8 shows a cross sectional view of the fourth token manufactured by the process of the present invention taken along line 8—8 of FIG. 7.

FIGS. 6–8 show another variation of the present invention in which the token is configured to appear like a gaming chip. The token 300 includes a border area 320 with the edge 322 being either plain or serrated ("reeded") as is conventional.

The token 300 is minted from a blank, which is fabricated in a conventional manner of any suitable metallic composition. The token 300 is struck using a pair of conventional minting dies. During the striking of the token 300 from the blank, a central cavity 328 is formed on both sides of the token 300 resulting in a thinner center area 324 of the same metal as the thicker rim portion 322 of the token 300. The cavity 328 can be provided either on one side of the token 300 or each side of the token 300.

In addition to the cavities 328 being formed, also formed during the minting operation are a plurality of arcuate outer recessed segments 331 around the periphery of the border area 320 on each side of the token 300. These segments 331 are spaced at regular intervals around the border area 320 of the token 300 and more preferably are three in number equally spaced.

The minting operation also creates the minted indicia 326 in the metal area of the border area 320. In this border area 320, any indicia 326 that can be formed by conventional minting operations can be used. The minted indicia can be either embossed or debossed indicia in either letter, word, symbol, picture or any other desired format.

As described above in connection with the other embodiments, alternatively, the token can be formed by conventional metal casting operations.

Figure 9:
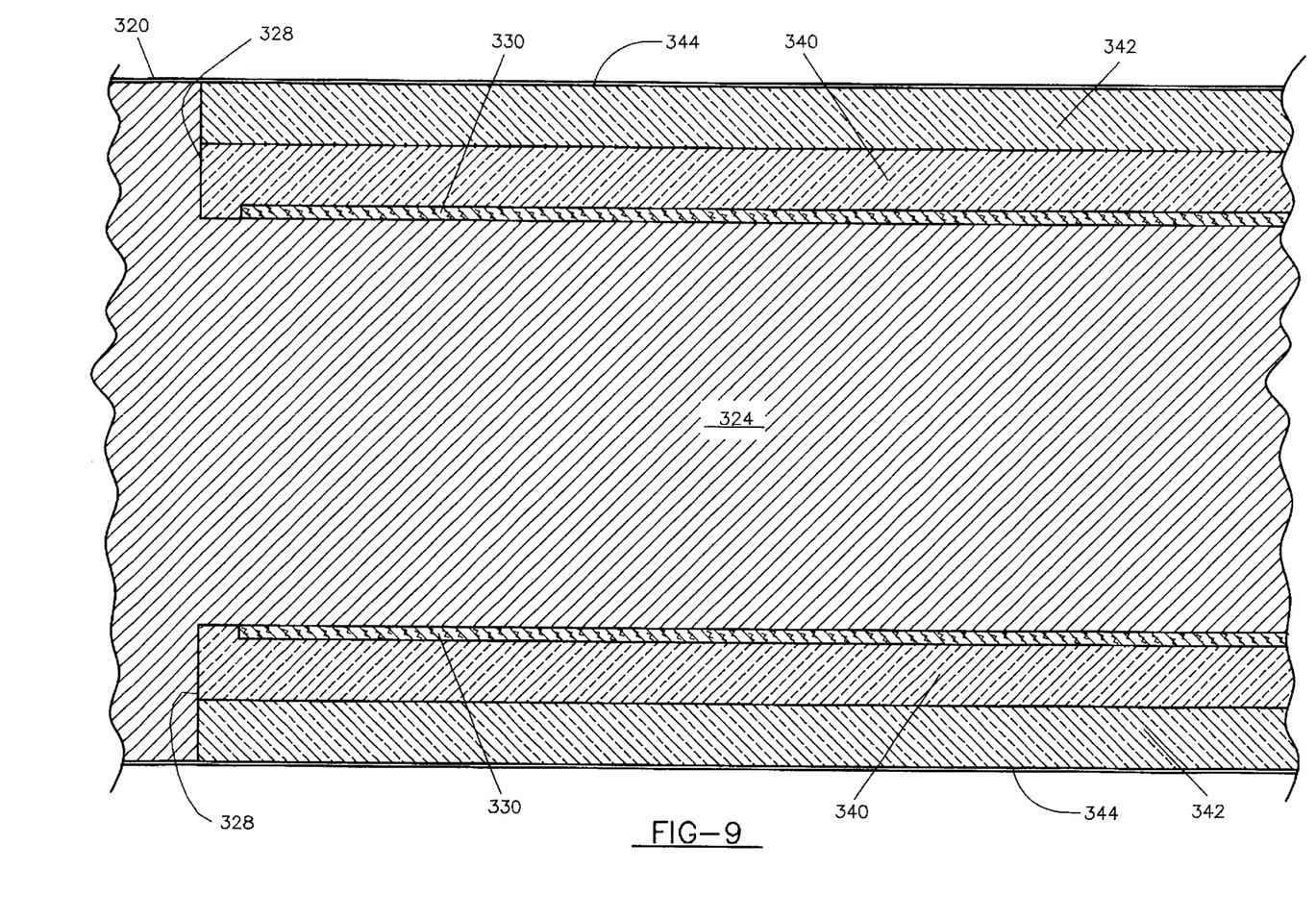
FIG. 9 shows an enlarged cross sectional view of a portion of the fourth token shown in FIG. 8 to show more detail of the present invention.

The center area 324 of the token 300 is less thick than the border area 320 which results in a central cavity 328 on each side of the coin above and below the center area 324. Each cavity 328 is designed to receive an imprinted disk 330 which is covered by a first protective coating 340.

The imprinted disk 330 carries printed indicia 332 on its outer surface and the first protective coating 340 is preferably a transparent material so that the printed indicia 332 can be observed by the user of the token 300. Alternatively, the first protective coating can be a translucent material that allows the image of the printed indicia to be observed while at the same time allowing a tint or color to be included into the first protective coating 340. The imprinted disk 330 can include letters, words, symbols, or pictures in any suitable pattern or design either single or multi-colored.

A first protective coating 340 is applied to cover the imprinted disk 330 in the cavity 328. In this embodiment, the first protective coating 340 fills the cavity 328 to only approximately half of its depth. This first protective coating can be of the same materials used for the first protective coating described in connection with FIGS. 1–3 and can be applied and cured, if necessary in the same manner as described above.

The remaining depth of the cavity 328 is filled with a second protective coating 342. Preferably this second protective coating should be a slip agent in the form of a cationic epoxy including silicones. Additionally or optionally, an outer coating 344 can be applied to cover the entire surface of the token 300.

Each of the outer recessed segments 331 is filled with a suitable plastic insert 336. Any suitable plastic material can be used such as the same Kaleidoclear material used for the first protective coating 340. The material used for the plastic insert 336 can be transparent so that any minted indicia there below will show through or translucent so that a tint or color can be added to the plastic insert 336 so that the token 300 will more closely resemble a gaming chip.

The fabrication steps for forming the token 300, the imprinted disk 330 and for applying the coatings can be any of the techniques described above in connection with token 10 and token 100 shown in FIGS. 1–5 using either a batch processing technique or a continuous processing technique. Likewise, the materials used for the metal portions, the imprinted disk 330, the first protective coating 340, the second protective coating 342 and the outer coating 344 can also be the same materials that were described above in connection with token 10 and token 100 shown in FIGS. 1–5.

As used in the specification and accompanying claims, the terms "minting" and "casting" and their variants are used interchangeably and are intended to be equivalent methods of fabricating metallic tokens.

Another suitable technique eliminates the use of the imprinted disk 30. An image is screen printed onto a release paper. The release paper is placed into the cavity 28 and the printed indicia 32 is heat transferred directly onto the metal at the bottom of the cavity 28.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A method of making a token having a minted portion and an imprinted portion comprising:
   a) providing a metal blank having the desired metallic composition for a token, the metal blank having a border area, a raised center area and an annular cavity surrounding the raised center area;
   b) inserting an imprinted disk in the annular cavity of the token; and
   c) filling a portion of the annular cavity with a first protective coating and the remainder with a second protective coating to prevent scratching of the imprinted disk.

2. The method of claim 1 further including providing minted indicia in the raised center area.

3. The method of claim 1 wherein the imprinted disk is inserted by hand.

4. The method of claim 1 wherein the imprinted disk is inserted by an automatic label applying machine.

5. The method of claim 1 wherein the first protective coating is transparent.

6. The method of claim 1 wherein the first protective coating is translucent.

7. The method of claim 1 wherein the second protective coating is transparent.

8. The method of claim 1 wherein the second protective coating is translucent.

9. The token made by the method of claim 1.

10. The method of claim 1 further including applying an outer coating over the entire token.

11. The method of claim 10 wherein the outer coating is transparent.

12. The method of claim 10 wherein the outer coating is translucent.

13. The token made by the method of claim 10.

14. A method of making a token having minted portions and imprinted portions on each side of the token comprising:
   a) providing a metal blank having the desired metallic composition for a token, the metal blank having a border area, a raised center area and an annular cavity surrounding the raised center area on each side of the token;
   b) inserting an imprinted disk in the annular cavity on each side of the token; and
   c) filling a portion of each annular cavity with a first protective coating and the remainder with a second protective coating to prevent scratching of the imprinted disk.

15. The method of claim 14 further including providing minted indicia in the raised center area.

16. The method of claim 14 wherein the imprinted disk is inserted by hand.

17. The method of claim 14 wherein the imprinted disk is inserted by an automatic label applying machine.

18. The method of claim 14 wherein the first protective coating is transparent.

19. The method of claim 14 wherein the first protective coating is translucent.

20. The method of claim 14 wherein the second protective coating is transparent.

21. The method of claim 14 wherein the second protective coating is translucent.

22. The token made by the method of claim 14.

23. The method of claim 14 further including applying an outer coating over the entire token.

24. The method of claim 23 wherein the outer coating is transparent.

25. The method of claim 23 wherein the outer coating is translucent.

26. The token made by the method of claim 23.

27. A method of making a token having a minted portion and an imprinted portion comprising:
   a) providing a metal blank having the desired metallic composition for a token; the metal blank having a border area a raised center area and an annular cavity surrounding the raised center area;
   b) inserting an imprinted disk in the annular cavity of the token;
   c) preheating the imprinted disk to alter the surface energy of the imprinted disk whereby a protective coating will more securely adhere to the imprinted disk;
   d) filling a portion of the cavity with a first protective coating and the remainder with a second protective coating to prevent scratching of the imprinted disk; and
   e) curing the first protective coating to harden the protective coating so that the protective coating will be scratch resistant.

28. The method of claim 27 further including providing minted indicia in the raised center area.

29. The method of claim 27 wherein the imprinted disk is inserted by hand.

30. The method of claim 27 wherein the imprinted disk is inserted by an automatic label applying machine.

31. The method of claim 27 wherein the first protective coating is transparent.

32. The method of claim 27 wherein the first protective coating is translucent.

33. The method of claim 27 wherein the second protective coating is transparent.

34. The method of claim 27 wherein the second protective coating is translucent.

35. The token made by the method of claim 27.

36. The method of claim 27 further including applying an outer coating over the entire token.

37. The method of claim 36 further including curing the outer coating to harden the coating so that the token will be scratch resistant.

38. The method of claim 36 wherein the outer coating is transparent.

39. The method of claim 36 wherein the outer coating is translucent.

40. The token made by the method of claim 36.

41. The method of claim 27 wherein the preheating of the imprinted disk is done by applying a flame corona discharge to the imprinted disk.

42. The method of claim 27 wherein the curing of the first transparent coating is done by ultraviolet light.

43. A method of making a token having a minted portion and an imprinted portion on each side of the token comprising:
- a) providing a metal blank having the desired metallic composition for a token; the metal blank having a border area a raised center area and an annular cavity surrounding the raised center area on each side of the token;
- b) inserting an imprinted disk in the annular cavity on each side of the token;
- c) preheating the imprinted disk on each side of the token to alter the surface energy of the imprinted disk whereby a protective coating will more securely adhere to the imprinted disk;
- d) filling a portion of the annular cavity on each side of the token with a first protective coating and the remainder with a second protective coating to prevent scratching of the imprinted disk; and
- e) curing the first protective coating to harden the protective coating so that the protective coating will be scratch resistant.

44. The method of claim 43 further including providing minted indicia in the raised center area.

45. The method of claim 43 wherein the imprinted disk is inserted by hand.

46. The method of claim 43 wherein the imprinted disk is inserted by an automatic label applying machine.

47. The method of claim 43 wherein the first protective coating is transparent.

48. The method of claim 43 wherein the first protective coating is translucent.

49. The method of claim 43 wherein the second protective coating is transparent.

50. The method of claim 43 wherein the second protective coating is translucent.

51. The token made by the method of claim 43.

52. The method of claim 43 further including applying an outer coating over both sides of the entire token.

53. The method of claim 52 further including curing the outer coating to harden the protective coating so that the token will be scratch resistant.

54. The method of claim 52 wherein the outer coating is transparent.

55. The method of claim 52 wherein the outer coating is translucent.

56. The token made by the method of claim 52.

57. The method of claim 43 wherein the preheating of the imprinted disk is done by applying a flame corona discharge to the imprinted disk.

58. The method of claim 43 wherein the curing of the first transparent coating is done by ultraviolet light.

59. A method of making a token having a minted portion and an imprinted portion comprising:
- a) providing a metal blank having the desired metallic composition for a token, the metal blank having a generally planar portion and at least one cavity therein;
- b) inserting an imprinted disk in the cavity of the token; and
- c) filling a portion of the cavity with a first protective coating and the remainder with a second protective coating to prevent scratching of the imprinted disk.

60. The method of claim 59 further including providing minted indicia in the generally planar portion.

61. The method of claim 59 wherein the imprinted disk is inserted by hand.

62. The method of claim 59 wherein the imprinted disk is inserted by an automatic label applying machine.

63. The method of claim 59 wherein the first protective coating is transparent.

64. The method of claim 59 wherein the first protective coating is translucent.

65. The method of claim 59 wherein the second protective coating is transparent.

66. The method of claim 59 wherein the second protective coating is translucent.

67. The token made by the method of claim 59.

68. The method of claim 59 further including applying an outer coating over the entire token.

69. The method of claim 68 wherein the outer coating is transparent.

70. The method of claim 68 wherein the outer coating is translucent.

71. The token made by the method of claim 68.

72. The method of claim 59 wherein the token has a non-circular perimeter and a plurality of cavities of various shapes.

* * * * *